(12) United States Patent
Umebayahi et al.

(10) Patent No.: US 6,265,692 B1
(45) Date of Patent: Jul. 24, 2001

(54) AIR CONDITIONER HAVING ELECTRICAL HEATING MEMBER INTEGRATED WITH HEATING HEAT EXCHANGER

(75) Inventors: Makoto Umebayahi, Chiryu; Hiroaki Shiraishi, Toyoake, both of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/526,007

(22) Filed: Mar. 15, 2000

(30) Foreign Application Priority Data

Mar. 19, 1999 (JP) .................................................. 11-076564

(51) Int. Cl.⁷ ...................................................... B60H 1/22
(52) U.S. Cl. .......................... 219/202; 165/299; 165/300; 165/41; 392/485
(58) Field of Search ..................................... 219/202, 541, 219/530, 540; 392/496, 485; 165/299, 300, 41, 172–176, 151, 148, 143

(56) References Cited

U.S. PATENT DOCUMENTS 6,037,567 * 3/2000 Inoue et al. ........................... 219/202

6,055,360 * 4/2000 Inoue et al. ........................... 392/485
6,078,024 * 6/2000 Inoue et al. ........................... 219/202
6,178,292 * 1/2001 Fukuoka et al. ...................... 392/485

FOREIGN PATENT DOCUMENTS

| 2043235 | 10/1980 | (GB) . |
| 2325732 | 12/1998 | (GB) . |
| 5-69732 | 3/1993 | (JP) . |
| 11-48759 | 2/1999 | (JP) . |

* cited by examiner

Primary Examiner—John A. Jeffery
(74) Attorney, Agent, or Firm—Harness, Dickey & Pierce, PLC

(57) ABSTRACT

In a vehicle air conditioner, an electrical heating member is disposed integrally with a heating heat exchanger including a core portion and upper and lower tanks. An electrical connection portion of the electrical heating member is disposed on a downstream air side of the lower tank of the heating heat exchanger. Therefore, the lower tank of the heating heat exchanger can restrict water from being covered onto the electrical connection portion of the electrical heating member. Thus, an electrical short circuit in the electrical connection portion is prevented, while air flow resistance is restricted from being increased.

14 Claims, 5 Drawing Sheets

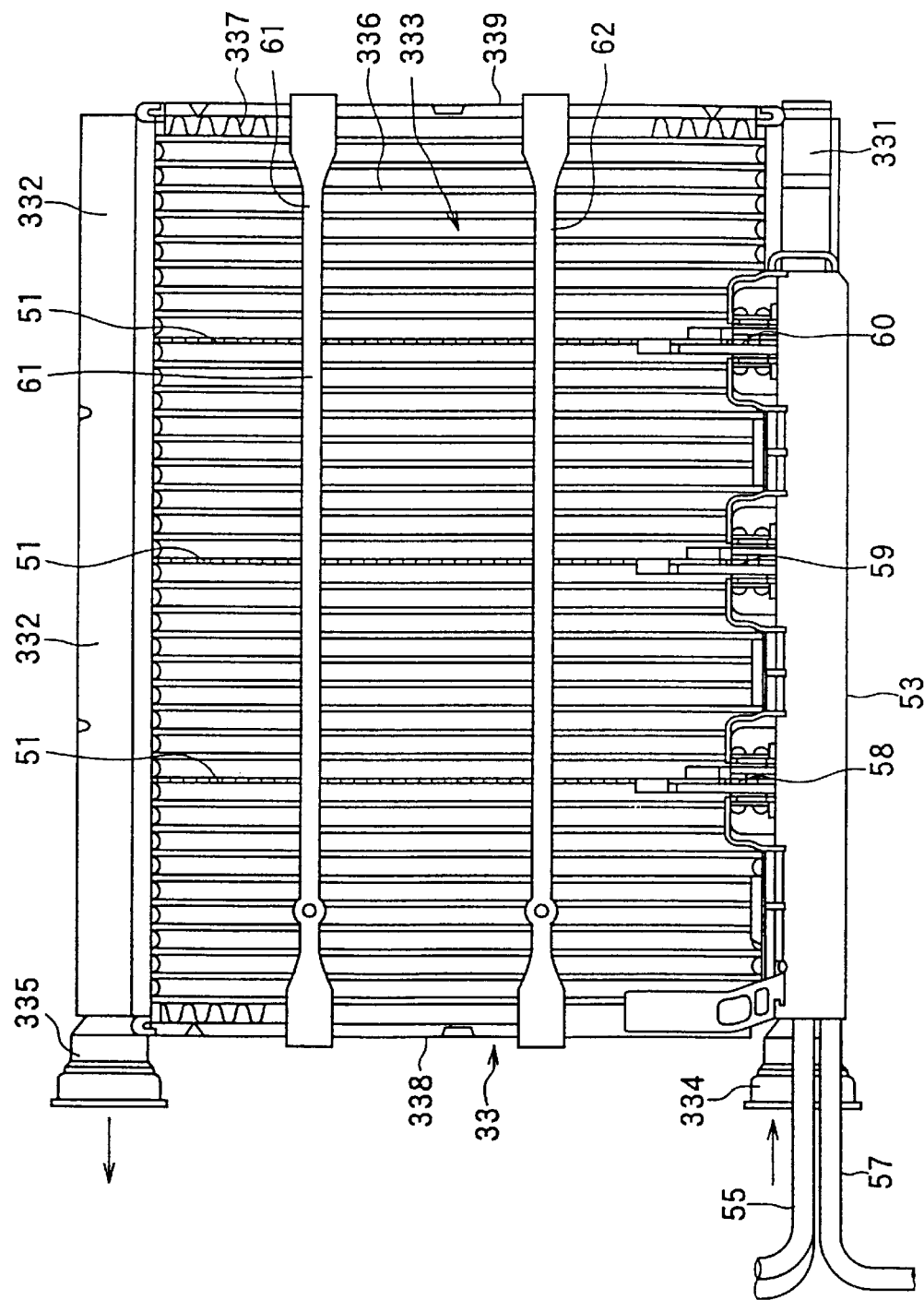

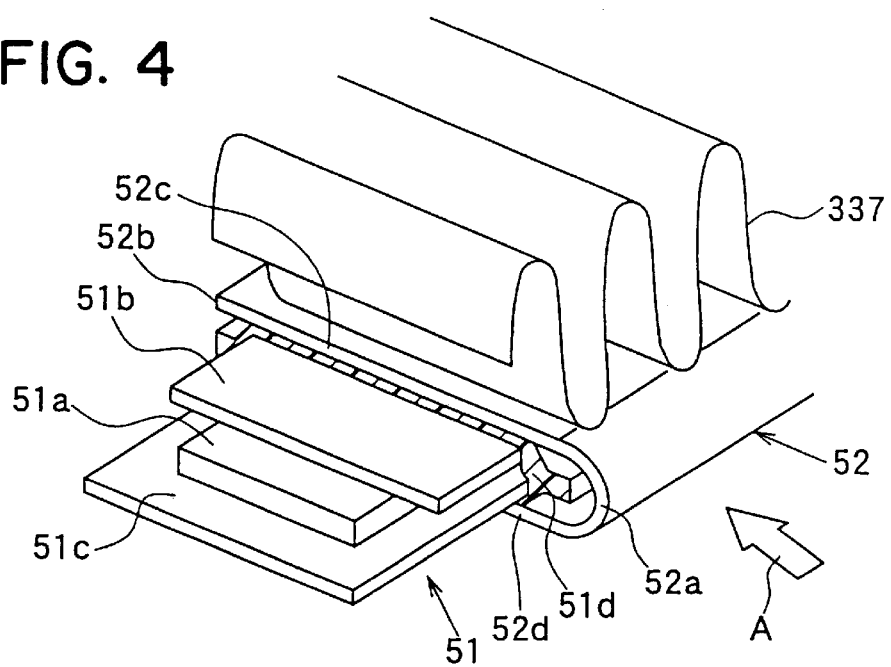
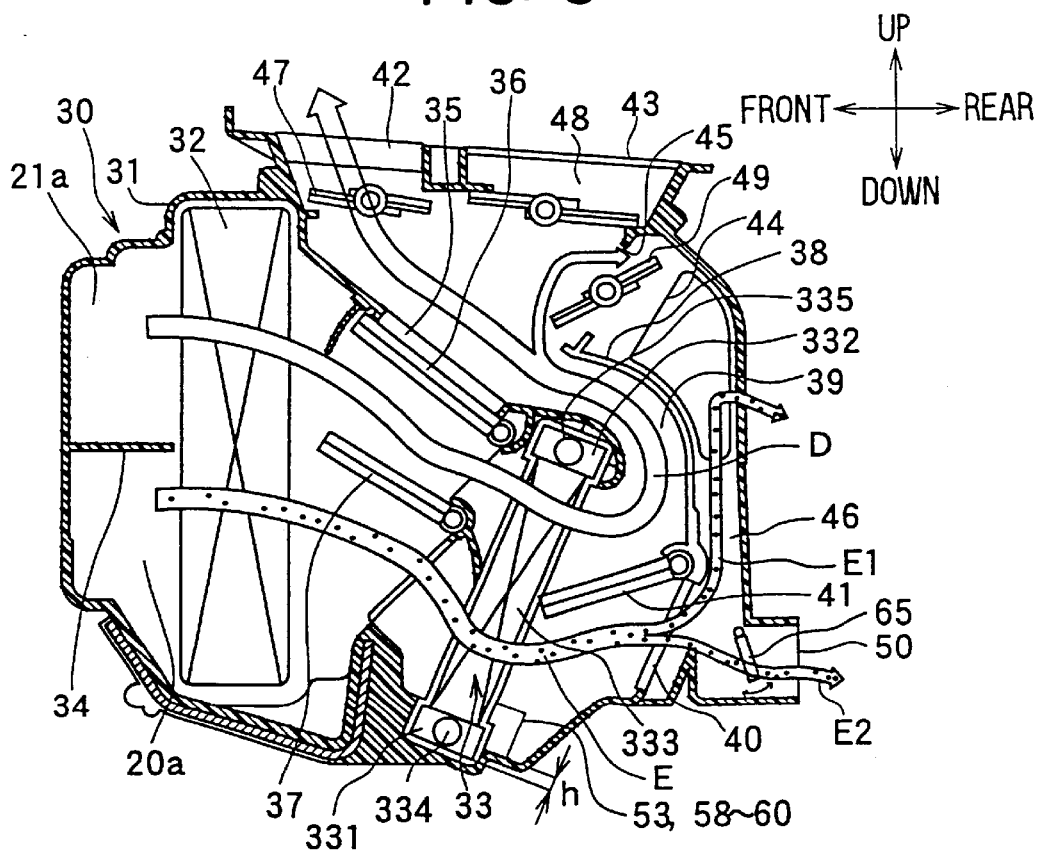

AIR CONDITIONER HAVING ELECTRICAL HEATING MEMBER INTEGRATED WITH HEATING HEAT EXCHANGER

CROSS-REFERENCE TO RELATED APPLICATION

This application is related to and claims priority from Japanese Patent Application No. Hei. 11-76564 filed on Mar. 19, 1999, the contents of which are hereby incorporated by reference.

BACKGROUND OF THE INVENTION

1. Field of the Invention

The present invention relates to a vehicle air conditioner which includes a heating heat exchanger and electrical heating members integrated with the heating heat exchanger.

2. Description of Related Art

JP-A-5-69732 describes a heating heat exchanger integrated with plural electrical heating members. When temperature of hot water (engine-cooling water) flowing into the heating heat exchanger is lower than a set temperature, electrical power is supplied to the electrical heating members to heat air using heat generated from the electrical heating members. However, in the conventional heating heat exchanger, an electrical connection between the electrical heating members and an outer circuit is not described. Further, because a cooling heat exchanger is disposed at an upstream air side of the heating heat exchanger, condensed water generated on the cooling heat exchanger may be adhered to the heating heat exchanger by the air flow, and an electrical connection portion of the electrical heating members may be short-circuited. Further, when the electrical connection portion of the electrical heating members protrudes to a core portion of the heating heat exchanger, an air-flow resistance is increased.

SUMMARY OF THE INVENTION

In view of the foregoing problems, it is an object of the present invention to provide a vehicle air conditioner having an electrical heating member integrated with a heating heat exchanger, which prevents trouble at an electrical connection portion of the electrical heating member, such as a short-circuit.

According to the present invention, a heating heat exchanger disposed in the air conditioning case includes a core portion having a plurality of tubes through which a fluid flows and a plurality of fin members connected to the tubes, and a tank portion disposed at a lower side of the core portion to communicate with the tubes. Further, an electrical heating member is disposed integrally with the heating heat exchanger, and an electrical connection portion of the electrical heating member is disposed on a downstream side position of the tank portion in an air flow direction. Thus, the tank portion can prevent water from being introduced to the electrical connection portion of the electrical heating member. Thus, a trouble such as an electrical short circuit of the electrical connection portion is effectively prevented. Further, because the tank position of the heating heat exchanger is disposed away from a main flow passage of air, it can prevent air flow resistance from increasing due to the arrangement of the electrical connection portion.

Preferably, the heating heat exchanger is disposed to be inclined toward a downstream air side relative to a vehicle up-down direction, and the electrical connection portion has a bottom surface higher than a bottom surface of the first tank portion in the vehicle up-down direction. Therefore, a size of an air conditioner is reduced, and the air conditioner is readily mounted on a vehicle.

BRIEF DESCRIPTION OF THE DRAWINGS

Additional objects and advantages of the present invention will be more readily apparent from the following detailed description of preferred embodiments when taken together with the accompanying drawings, in which:

FIG. 3 is a front view showing the heater core according to the first embodiment;

FIG. 4 is a partly enlarged perspective view showing an electrical heating member integrated with the heater core according to the first embodiment;

FIG. 6 is a schematic sectional view showing a ventilation system of a vehicle air conditioner according to a second preferred embodiment of the present invention.

DETAILED DESCRIPTION OF THE PRESENTLY PREFERRED EMBODIMENTS

Preferred embodiments of the present invention will be described hereinafter with reference to the accompanying drawings.

A first preferred embodiment of the present invention will be described with reference to FIGS. 1–5B. The first embodiment of the present invention is suitable for a vehicle in which an amount of heat generated from an engine is relatively small to heat cooling water (hot water) with the engine sufficiently, such as a vehicle having a diesel engine, an electrical vehicle and a hybrid vehicle. In a vehicle air conditioner described in FIG. 1, an inside/outside air double layer flow mode can be set in a maximum heating.

Figure 1:
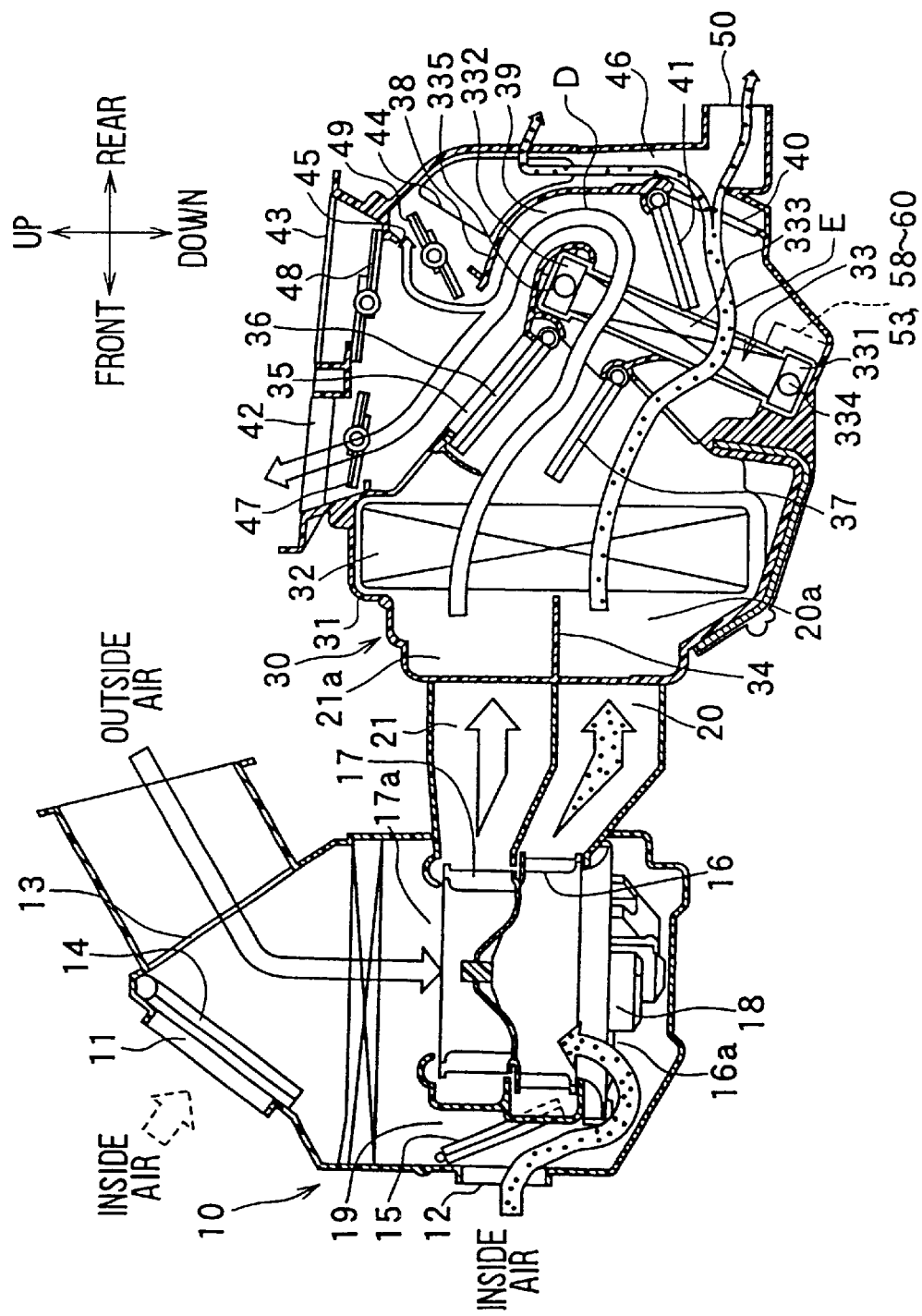
FIG. 1 is a schematic sectional view showing an entire ventilation system of a vehicle air conditioner according to a first preferred embodiment of the present invention.

As shown in FIG. 1, a ventilation system of the air conditioner includes a blower unit 10 and an air conditioning unit 30. The air conditioning unit 30 is generally disposed in a passenger compartment under an instrument panel at an approximate center of the instrument panel in a vehicle right-left direction (i.e., vehicle width direction). The air conditioning unit 30 is mounted on the vehicle to correspond to the arrangement in FIG. 1. On the other hand, the blower unit 10 is generally disposed to be shifted from the air conditioning unit 30 in the vehicle right-left direction on a front passenger's seat side. However, in FIGS. 1, 2, for readily indicating both the blower unit 10 and the air conditioning unit 30, the blower unit 10 is arranged on a vehicle front side of the air conditioning unit 30.

Firstly, the blower unit 10 is described in detail. The blower unit 10 includes first and second inside air introduction ports 11, 12 from which inside air (i.e., air inside the passenger compartment) is introduced, and an outside air introduction portion 13 from which outside air (i.e., air outside the passenger compartment) is introduced. The first inside air introduction port 11, the second inside air introduction port 12 and the outside air introduction port 13 are selectively opened and closed by first and second inside/outside air switching doors 14, 15. Each of the first and second inside/outside air switching doors 14, 15 is a plate-like door rotatable around a rotation shaft.

The blower unit 10 has a blower case, and first and second fans 16, 17 overlapped in an up-down direction within the blower case. The first and second fans 16, 17 are composed of a centrifugal multi-blades fan (sirocco) and are rotated simultaneously by a single common electrical motor 18.

FIG. 1 shows an operation state of the air conditioner during an inside/outside air double layer flow mode (hereinafter, referred to as "double layer flow mode"). During the double layer flow mode, the first inside/outside air switching door 14 closes the first inside air introduction port 11 and opens the outside air port 13, and the second inside/outside air switching door 15 opens the second inside air introduction port 12 and closes a communication path 19. Therefore, inside air introduced from the second inside air introduction port 12 is sucked into a suction port 16a of the first fan 16, and is blown into a first air passage 20. On the other hand, outside air introduced from the outside air port 13 is sucked into a suction port 17a of the second fan 17, and is blown into a second air passage 21.

Further, as shown in FIG. 1, first and second air passages 20, 21 are partitioned by a partition plate disposed between the first fan 16 and the second fan 17 in the blower unit 10.

The air conditioning unit 30 includes an evaporator 32 and a heater core 33 integrally accommodated within an air conditioning case 31. Within the air conditioning case 31, a first air passage 20a on a lower and the second air passage 21a on an upper side are also partitioned from each other by a partition plate 34 at an upstream air side of the evaporator 32. Thus, air from the first and second air passages 20, 21 of the blower unit 10 flows into the first and second air passages 20a, 21a of the air conditioning unit 30, respectively. The evaporator 32 is disposed within the air conditioning case 31 to cross an entire area of the first and second air passages 20a, 21a. As being known well, the evaporator 32 is a cooling heat exchanger for cooling air passing therethrough by absorbing an evaporation latent heat of refrigerant of a refrigerant cycle from air.

The heater core 33 is disposed within the air conditioning case 31 at a downstream air side of the evaporator 32 to form a predetermined distance between the heater core 33 and the evaporator 32. The heater core 33 is disposed to be inclined toward a vehicle rear side relative to the vehicle up-down direction (i.e., vertical direction) by a predetermined angle. The heater core 33 is a heating heat exchanger for heating air having passed through the evaporator 32. The heater core 33 heats air passing therethrough by using hot water (engine-cooling water) as a heating source. Further, the heater core 33 is disposed in the air conditioning case 31 to form a bypass passage 35 at an upper side of the heater core 33, through which air having passed through the evaporator 32 bypasses the heater core 33.

First and second air mixing doors 36, 37 are disposed within the air conditioning case 31 between the evaporator 32 and the heater core 33 to adjust a ratio between an air amount passing through the heater core 33 and an air amount bypassing the heater core 33. Each of the first and second air mixing doors 36, 37 is a plate like door rotatable in the vehicle up-down direction. The first and second air mixing doors 36, 37 are disposed to have a predetermined distance therebetween in the vehicle up-down direction. Therefore, the first and second air mixing doors 36, 37 are respectively rotatable without an interference therebetween. Further, in a maximum cooling, both the air mixing doors 36, 37 are rotated to fully close an air inlet passage of the heater core 33 while being overlapped with each other.

On the other hand, in the maximum heating, both the air mixing doors 36, 37 are rotated to the positions indicated in FIG. 1. Therefore, the first air mixing passage 36 fully closes the cool air bypass passage 35, and a top end of the second mixing door 37 is positioned at a center position of the evaporator 32 in the vehicle up-down direction, immediately downstream air side of the evaporator 32. Thus, the second air mixing door 37 is used as a movable partition member for partitioning an air passage between the evaporator 32 and the heater core 33 into the first air passage 20a and the second air passage 21a during the maximum heating.

Further, a partition wall 38 extending in the vehicle up-down direction is provided at a downstream air side of the heater core 33 to have a predetermined distance between the partition wall 38 and the heater core 33, and is formed integrally with the air conditioning case 31. The partition wall 38 defines a warm air passage 39 through which air immediately after passing through the heater core 33 flows upwardly. Warm air from the warm air passage 39 and cool air from the cool air bypass passage 35 are mixed at an upper side position of the heater core 33.

Further, a warm air bypass opening 40 is opened at a lower side of the partition wall 38, and is opened and closed by a plate-like warm air bypass door 41. When the maximum heating (double layer flow mode) is set during a foot mode or a foot/defroster mode, the warm air bypass door 41 is operated to the position shown in FIG. 1 so that a top end of the warm air bypass door 41 is positioned at an approximate center position of the heater core 33 in the vehicle up-down direction. Therefore, the warm air bypass door 41 is used as a movable partition member for partitioning the warm air passage 39 immediately after the heater core 33 into the first air passage 20a and the second air passage 21a during the double layer flow mode.

On an upper surface of the air conditioning case 31, a defroster opening 42 from which air is blown toward an inner surface of a windshield is opened at a vehicle front side. Further, a face opening 43 from which air is blown toward the head portion of a passenger in the passenger compartment is opened on the upper surface of the air conditioning case 31 at a vehicle rear side from the defroster opening 42. Further, a front foot opening 44 is opened on both right and left surfaces of the air conditioning case 31. Conditioned air having been temperature-controlled flows into the front foot opening 44 through an inlet opening 45, and warm air from the warm air bypass opening 40 also flows into the front foot opening 44 through a warm air passage 46. Warm air from the front foot opening 44 is blown toward the foot area of a passenger on a front seat in the passenger compartment through a front foot duct (not shown).

The defroster opening 42, the face opening 43 and the inlet opening 45 of the front foot opening 44 are opened and closed by mode switching doors 47, 48, 49, respectively, each of which is a rotatable plate like door.

Further, a rear foot opening 50 is opened at a lower end portion of the air conditioning case 31 to face the warm air bypass opening 40. Therefore, warm air from the warm air bypass opening 40 and the warm air passage 46 flows into the rear foot opening 50, and is blown toward the foot area of a passenger on a rear seat through a rear foot duct (not shown).

Figure 2:
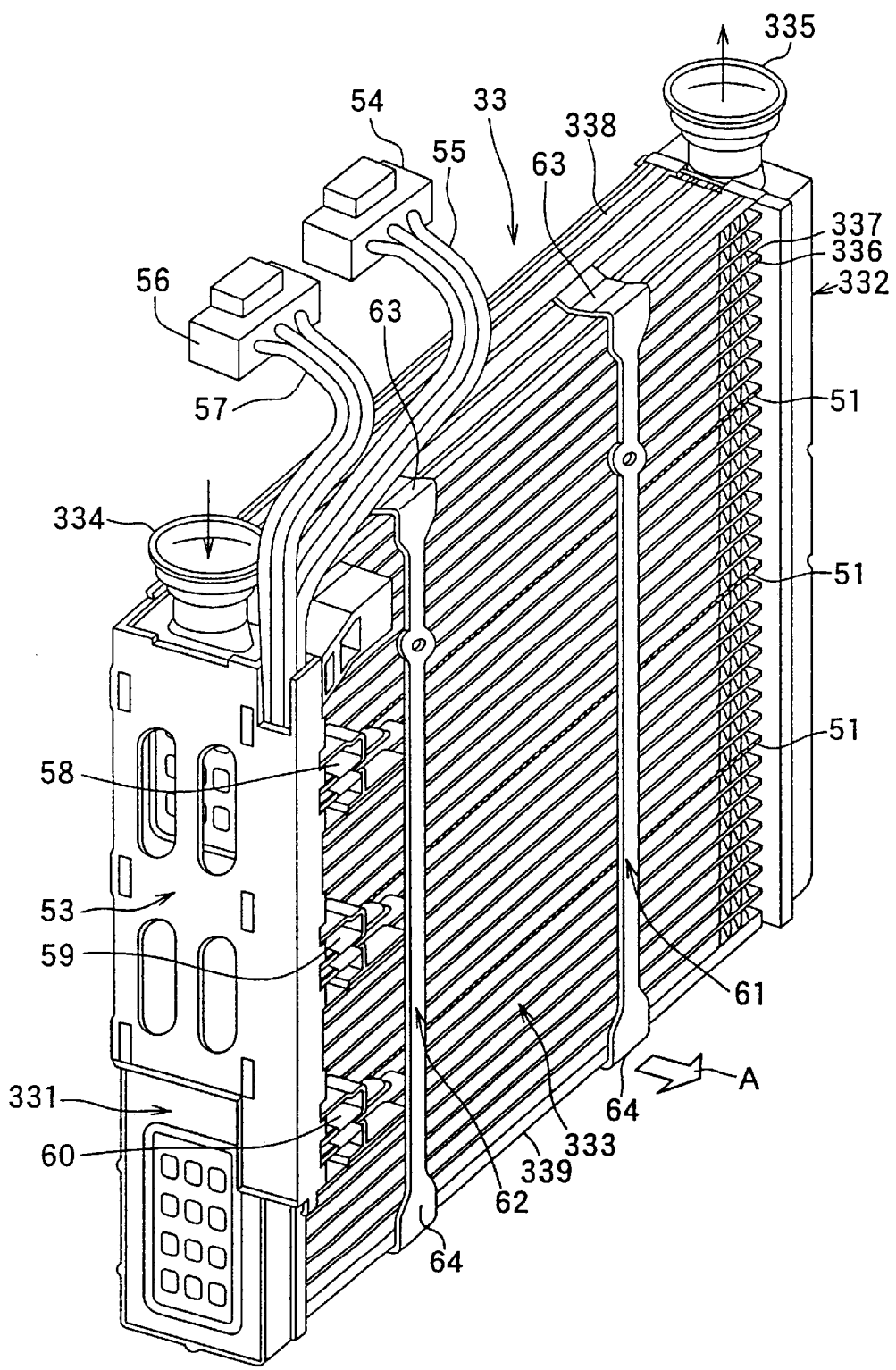
FIG. 2 is a perspective view showing a heater core according to the first embodiment.

Next, a structure of the heater core 33 will be now described in detail. As shown in FIGS. 2 and 3, the heater core 33 includes an inlet tank 331, an outlet tank 332, and a core portion 333 disposed between the inlet tank 331 and the outlet tank 332. An inlet pipe 334 for introducing hot water (engine-cooling water) from a vehicle engine into the inlet tank 331 of the heater core 33 is connected to the inlet tank 331, and an outlet pipe 335 for introducing hot water having been heat-exchanged in the core portion 333 into the vehicle engine is connected to the outlet tank 332 of the heater core 33.

The core portion 333 of the heater core 33 includes plural flat tubes 336 which are formed flatly in parallel with a flow direction A of air in FIG. 2 and are arranged to be laminated in a right-left direction in FIG. 3. The core portion 333 further includes plural corrugated fins 337 each of which is formed into a wave shape and is disposed between adjacent flat tubes 336. Both opening ends of each flat tube 336 are inserted into tube insertion holes (not shown) of both tanks 331, 332, respectively, and are connected to each other. Further, side plates 338, 339 are attached to corrugated fins 337 provided at most outer sides of the core portion 333, so that both the side plates 338, 339 are bonded to the most outside corrugated fins 337 and the inlet and outlet tanks 331, 332.

In the first embodiment, as shown in FIG. 1, the heater core 33 is disposed in the air conditioning case 31, so that the inlet tank 331 is placed at a lower side of the core portion 333 and the outlet tank 332 is placed at an upper side of the core portion 333 in the vehicle up-down direction. Therefore, hot water flowing into the inlet tank 331 flows through the whole flat tubes 336 upwardly, is collected into the outlet tank 332, and is discharged to an outside from the outlet pipe 335.

Electrical heating members 51 are disposed in the core portion 333 of the heater core 33, instead of a part of the flat tubes 336. As shown in FIGS. 2 and 3, three electrical heating members 51 are disposed in the core portion 333 at predetermined intervals, for example.

As shown in FIG. 4, a holding plate 52 having a U-shaped cross-section is disposed between adjacent corrugated fins 337, at each position where the electrical heating members 51 are provided. The holding plate 52 extends in a longitudinal direction of the flat tubes 336. The holding plate 52 formed into the U-shaped cross-section has a closed end portion 52a on an upstream air side of the core portion 333, and an opened end portion 52b on a downstream air side of the core portion 333. That is, the holding plate 52 is disposed in such a manner that the closed end portion 52a of the holding plate 52 is on an air inlet side of the core portion 333 and the opened end portion 52b thereof is on an air outlet side of the core portion 333.

The holding plate 52 has two opposite plate surfaces 52c, 52d disposed to have a predetermined distance therebetween. Each of the plate surfaces 52c, 52d is connected to folded top portions of the adjacent corrugated fins 337. The electrical heating member 51 is inserted into the holding plate 52 from the opened end portion 52b to be held in the holding plate 52. The electrical heating member 51 is held in the holding plate 52 to be electrically insulated from the holding plate 52.

An entire thickness of the holding plate 52 is set to be equal to each thickness of the flat tubes 336, so that the holding plate 52 is disposed between the adjacent corrugated fins 337, instead of one flat tube 336.

In the first embodiment of the present invention, the heater core 33 including the components 331–339 is made of aluminum (including aluminum alloy), and the U-shaped holding plate 52 is also made of aluminum. Because the three electrical heating members 51 have the same structure shown in FIG. 4, the structure of only one electrical heating member 51 is described.

The electrical heating member 51 includes a plate-like heat generating element 51a, and thin plate-like electrode plates 51b, 51c disposed face and back sides of the heat generating element 51a. That is, the heat generating element 51a is inserted between both electrode plates 51b, 51c to form a three-layers structure. A cover member 51d made of an electrical-insulating material is covered around the electrode plates 51b, 51c. Specifically, the cover member 51d is made of an electrical-insulating resin having a high heat resistance, such as polyimide resin.

The heat generating element 51a is a PTC heater element having positive resistance temperature characteristics such as titanic acid barium in which a value of the resistance thereof increases suddenly at a predetermined temperature, that is, Curie point (e.g., approximately 200° C.). In FIG. 4, the heat generating element 51a is formed into a rectangular shape; however, the heat generating element 51a may be formed into the other shape such as a circular shape.

Both the electrode plates 51b, 51c are made of electrically conductive metal such as aluminum, copper, stainless steel. Each longitudinal dimension of the electrode plates 51b, 51c is approximately equal to that of the holding plate 52. Plural heat generating elements 51a are arranged between the electrode plates 51b, 51c in the longitudinal direction of the electrode plates 51b, 51c. By pressing both the electrode plates 51b, 51c to the heat generating element 51a, the electrode plates 51b, 51c are electrically connected to each other.

Further, the cover member 51d is pressed to inner sides of the plate surfaces 52c, 52d of the holding plate 52 so that each electrical heating member 51 is assembled in the holding plate 52. The cover member 51d is used as the electrical-insulating member between the holding plate 52 and the electrode plates 51b, 51c, while being used as a heat-transition member for transmitting heat generated from the heat generating element 51a to the holding plate 52. Therefore, the cover member 51d is formed into a thin film like having a thickness range of 25 μm–100 μm between the holding plate 52 and the electrode plates 51b, 51c, so that heat generated from the heat generating element 51a can be effectively transmitted to the holding plate 52.

Figure 5B:
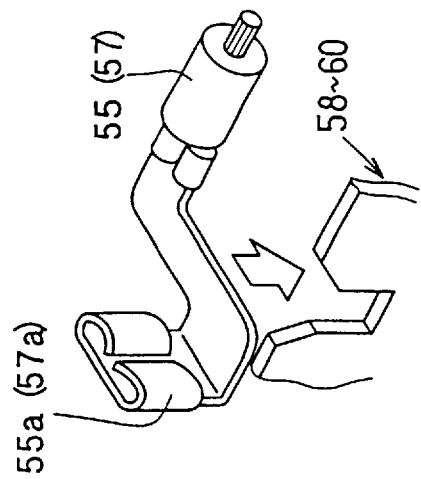
FIGS. 5A, 5B are disassemble views of an electrical connection portion of the electrical heating member.
Figure 5A:
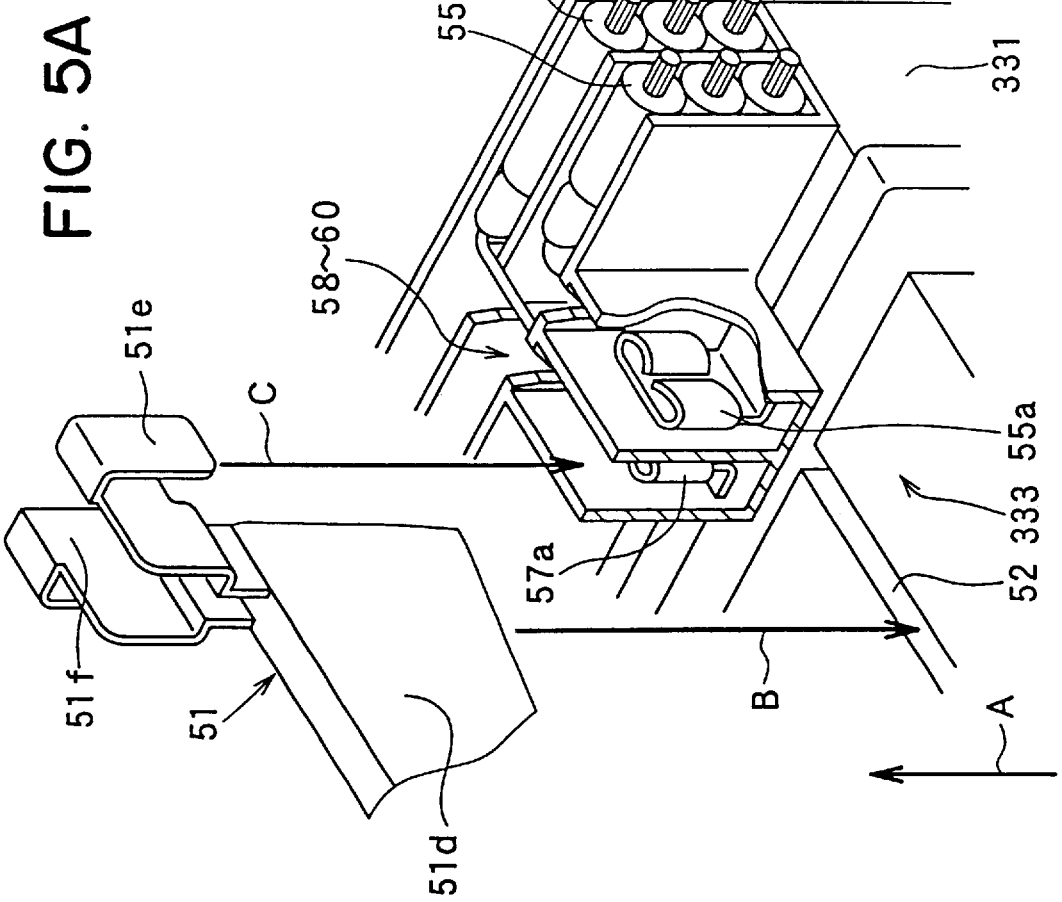

For example, in FIG. 4, the electrode plate 51b is a positive electrode, and the electrode plate 51c is a negative electrode. The positive electrode plate 51b and the negative electrode plate 51c are integrally formed with electrical connection terminals, respectively, at lower end position of the core portion 333. FIGS. 5A, 5B show an electrical connection structure of the electrical heating member 51. A positive terminal portion 51e and a negative terminal portion 51f of the positive electrode plate 51b and the negative electrode plate 51c are integrally formed to protrude from lower ends of the positive electrode plate 51b and the negative electrode plate 51c toward a downstream air side of the inlet tank 331 in the air flow direction A.

An electrical connection cover 53 made of an electrically-insulating resin such as polypropylene resin having some elastic performance is detachably attached to the inlet tank 331 by using an elastic engagement claw (not shown), as shown in FIG. 3. The electrical connection cover 53 is formed along the outer shape of the inlet tank 331.

As shown in FIG. 2. within the electrical connection cover 53, positive lead lines 55 having a positive connector 54 and negative lead lines 57 having a negative connector 56 are held. In the first embodiment, three positive lead lines 55 and three negative lead lines 57 are disposed to correspond to the number of the electrical heating members 51.

Three electrical connection portions 58, 59, 60 are provided in the electrical connection cover 53 at the downstream air side position in the air flow direction A. At each of the electrical connection portions 58, 59, 60, as shown in FIG. 5A, a connection terminal portion 55a of the positive lead lines 55 and a connection terminal portion 57a of the negative lead lines 57 are fixed.

When each of the electrical heating members 51 is inserted into the U-shaped holding plate 52 as shown by arrow B in FIG. 5A, the positive terminal portion 51e and the negative terminal portion 51f of both electrode plates 51b, 51c are press-inserted into the connection terminal portions 55a, 57a as shown by arrow C in FIG. 5A to be electrically connected. Therefore, in each of the electrical connection portions 58, 59, 60, the electrode plates 51b, 51c of the electrical heating member 51 are electrically connected to the lead lines 55, 57. FIG. 5B shows an attachment of the lead line 55, 57 including the connection terminal portions 55a, 57a at the electrical connection portions 58–60.

Further, the positive connector 54 and the negative connector 56 are electrically connected to an outer circuit (not shown), and electrical power is supplied to each electrical heating member 51 from an electrical source mounted on the vehicle through the outer circuit.

Band members 61, 62 made of a metal material having a spring performance are attached onto an air outlet surface of the core portion 333. Each of band members 61, 62 has bent hook portions 63, 64 at both ends. The hook portions 63, 64 of the band members 61, 62 are hooked into the left and right side plates 338, 339 in FIG. 3, so that the band members 61, 62 are attached between the left and right side plates 338, 339.

By attaching the band members 61, 62, each of the electrical heating members 51 is fastened between the plate surfaces 52c, 52d of the holding plate 52 in the core portion 333.

Here, a method for manufacturing the heater core 33 will be now described. First, the components of the heater core 33 shown in FIGS. 2, 3 are assembled. That is, the plural tubes 336 and the plural corrugated fins 337 of the core portion 33 are alternatively laminated, while the holding plates 52 extending in the longitudinal direction of the tubes 336 are disposed between adjacent corrugated fins 337 at positions where the three electrical heating members 51 are disposed.

For maintaining a distance between both the opposite plate surfaces 52c, 52d of the holding plate 52 at a predetermined distance, a dummy plate having a plate thickness equal to the predetermined distance is inserted into an inner side of the holding plate 52.

The dummy plate is made of a material such as carbon having a heat resistance without being aluminum-brazed in a brazing step described later. In this assembling step, the inlet and outlet tanks 331, 332, the inlet and outlet pipes 334, 335 and the side plates 338, 339 are also assembled to form an assembled integrated member.

Next, the assembled integrated member of the heat exchanger is held by a jig (not shown), and is moved into a furnace. In the furnace, the assembled integrated member is heated at a brazing temperature (e.g., 600° C.) so that an aluminum brazing material clad on the components of the heat exchanger is melted and the components of the heat exchanger are integrally brazed.

After the brazing step, the assembled integrated member is moved outside the furnace, and the temperature of the assembled integrated member of the heater exchanger is decreased to the normal temperature. Thereafter, each electrical heating member 51 is assembled. That is, separately from the assembled integrated member of the heat exchanger, the plate-like heat generating element 51 is inserted between electrode plates 51b, 51c to form the three-layer structure, and an entire outer peripheral of the electrode plates 51b, 51c is covered by the cover member 51d.

On the other hand, after the brazing step, the dummy plates are removed from the three holding plates 52. Thereafter, the electrical connection cover 53 having therein the positive lead lines 55 and the negative lead lines 57 is attached to an outer surface of the inlet tank 331, and each electrical heating member 51 is inserted into each holding plate 52 from the opening end portion 52b toward the closed end portion 52a. Simultaneously, at each of the electrical connection portions 58, 59, 60, the positive terminal portion 51e and the negative terminal portion 51f of the electrical heating member 51 are press-inserted into inner spaces of the connection terminal portions 55a, 57a of the lead lines 55, 57, respectively, as shown by the arrow C in FIG. 5A. Therefore, at the electrical connection portions 58, 59, 60, the electrode plates 51b, 51c of the three electrical heating members 51 are connected to the lead lines 55, 57, respectively.

Thereafter, the hook portions 63, 64 of the band members 61, 62 are hung to the left and right side plates 338, 339 so that the core portion 333 is pressed between the side plates 338, 339 by the band members 61, 62. Therefore, the electrical heating members 51 are tightly held in and fixed to the holding plates 52 by adding the fastening force of the band members 61, 62 to the core portion 333. Simultaneously, within each electrical heating member 51, because both surfaces of the heat generating element 51a are accurately pressed to the electrode plates 51b, 51c, an accurate electrical conduct state is obtained with a small contact resistance.

Next, operation of the heater core 33 having the above-described structure will be described. Hot water from the vehicle engine flows into the lower-side inlet tank 331 from the inlet pipe 334 by operation of a water pump of the vehicle engine. Hot water flowing into the inlet tank 331 is distributed into the plural flat tubes 336, flows through the entire flat tubes 336 upwardly, and is collected in the outlet tank 332. Hot water in the upper side outlet tank 332 flows outside through an outlet pipe 335, and returns to the vehicle engine.

Air passes through clearances between the flat tubes 336 and corrugated fins 337 of the core portion 333 of the heater core 33, when the first and second fans 16, 17 operate. Therefore, heat of hot water in the flat tubes 336 is radiated to air passing through the core portion 333 through the corrugated fins 337, and air passing through the core portion 333 is heated.

During the heating operation, when the temperature of hot water from the vehicle engine is lower than a set temperature (e.g., 80° C.), electrical voltage is applied between both electrode plates 51b, 51c of electrical heating member 51 through the connectors 54, 56, the lead lines 55, 57 from the electrical source mounted on the vehicle. Therefore, electrical power is supplied to the heat generating member 51a to generate heat therefrom. Heat generated from the heat generating element 51a is transmitted to the adjacent corrugated fins 337 through the electrode plates 51b, 51c, the cover member 51d and the holding plate 52, and is radiated to air passing through the core portion 333 from the corrugated fins 337. Thus, even when the temperature of hot water from the vehicle engine is low, air to be blown into the passenger compartment is quickly heated.

FIG. 1 shows the maximum heating state when the double layer flow mode is set. During the double layer flow mode, the first air mixing door 36 fully closes the cool air bypass passage 35, while the top end portion of the second air mixing door 37 is placed at the center position of the evaporator 32 in the vehicle up-down direction on an immediately downstream air side of the evaporator 32. Therefore, the air inlet passage of the heater core 33 is fully opened. At this time, the air passage between the evaporator 32 and the heater core 33 is partitioned into the first air passage 20a and the second air passage 21a by the second air mixing door 37.

Thus, inside air blown by the first fan 16 passes through the first air passages 20, 20a as shown by arrow E in FIG. 1 to be heated in the lower portion of the core portion 333 of the heater core 33, and the heated warm air is blown toward the foot area of the passenger in the passenger compartment through the foot openings 44, 50. Simultaneously, outside air blown by the second fan 17 passes through the second air passage 21, 21a as shown by arrow D in FIG. 1 to be heated in the upper portion of the core portion 333 of the heater core 33, and the heated warm air is blown toward the inner side of the windshield through the defroster opening 42 to defrost the windshield.

Similarly to the flat tubes 336 of the heater core 33, the electrical heating members 51 are disposed to extend in the vehicle up-down direction over both the first and second air passages 20a, 21a. Therefore, during the double layer flow mode, it is possible to heat both inside air and outside air by the electrical heating members 51. Thus, even when electrical power is supplied to the electrical heating members 51, a suitable temperature difference of blown-air between upper and lower sides is maintained.

In the vehicle air conditioner, because the evaporator 32 is disposed at an upstream air side of the heater core 33, condensed water generated on the evaporator 32 may be introduced to the heater core 33 together with the air flow. Further, when water or snow is entered into the air conditioning case 31 from the outside air introduction port 13, the heater core 33 may be readily covered by water. However, in the first embodiment of the present invention, the electrical connection portions 58–60 of each electrical heating member 51 are disposed at the downstream air side of the lower side tank 331 of the heater core 33. Therefore, the lower side tank 331 effectively prevents water from being introduced to the electrical connection portions 58–60 of the electrical heating members 51.

Further, in the air passage of the air conditioner, the upper side tank 332 is provided near the air flow shown by the arrow D in FIG. 1. Therefore, when the electrical connection portions 58–60 of the electrical heating members 51 are disposed at the upper side tank 332, the electrical connection portions 58–60 protrude to the air passage of the core portion 333, and the air flow resistance is increased in the core portion 333 of the heater core 33. However, according to the first embodiment, the electrical connection portions 58–60 of each electrical heating member 51 are disposed at the downstream air side of the lower side tank 331 of the heater core 33. Because the lower side tank 331 is provided to be away from a main air flow shown by arrow E in FIG. 1, the protrusion shapes of the electrical connection portions 58–60 hardly affect the warm air flow E. Thus, even when the electrical connection portions 58–60 slightly protrude to the air passage of the core portion 333, the air flow resistance is restricted from being increased.

A second preferred embodiment of the present invention will be now described with reference to FIG. 6. In the above-described first embodiment of the present invention, the bottom surface of the lower side tank 331 of the heater core 33 and the bottom surface of the electrical connection cover 53 are arranged approximately on the same surface. However, because the heater core 33 is disposed to be inclined by a predetermined angle toward the vehicle rear side relative to the vehicle up-down direction, the bottom surface of the electrical connection cover 53 protrudes downwardly from the bottom surface of the heater core 33.

In the second embodiment, as shown in FIG. 6, the bottom surface of the electrical connection cover 53 is disposed at an upper side of the bottom surface of the lower side tank 331 stepwise by a predetermined dimension "h". Thus, even when the heater core 33 is disposed to be inclined to the vehicle rear side, the electrical connection cover 53 does not protrude downwardly from the heater core 33, and the air conditioner is readily mounted on the vehicle.

On the other hand, in the second embodiment, a plate-like door 65 is disposed rotatably in an air passage of the rear foot opening 50. Thus, a ratio between an air amount flowing toward the front foot opening 44 as shown by arrow E1 and an air flow flowing toward the rear foot opening 50 as shown by arrow E2 is adjusted by the door 65. That is, by adjusting an opening degree of the door 65, the heating capacity for the front seat side and the heating capacity for the rear seat side can be adjusted. In the second embodiment, the other portions are similar to those in the above-described first embodiment.

Although the present invention has been fully described in connection with the preferred embodiments thereof with reference to the accompanying drawings, it is to be noted that various changes and modifications will become apparent to those skilled in the art.

For example, in the heater core 33, only a single tank may be disposed on the lower side of the core portion 333, and the tubes 336 are disposed so that hot water U-turns in the upper side space of the core portion 333.

In the above-described first and second embodiments of the present invention, the electrical connection portions 58–60 are disposed on the downstream air side of the lower side tank 331. However, the electrical connection portions 58–60 may be disposed on a downstream air side of any one of tanks 331, 332 of the heating heat exchanger 33. Further, in this case, the present invention may be applied to a heating heat exchanger where the tanks 331, 332 and the core portion 333 are disposed with the other arrangement.

Such changes and modifications are to be understood as being within the scope of the present invention as defined by the appended claims.

What is claimed is:

1. An air conditioner for a vehicle comprising:
   an air conditioning case for defining an air passage through which air flows;
   a heating heat exchanger disposed in said air conditioning case for heating air passing therethrough, said heating heat exchanger including
   a core portion having a plurality of tubes through which a fluid flows and a plurality of fin members connected to said tubes, and
   a first tank portion disposed at a lower side of said core portion to communicate with said tubes; and an electrical heating member disposed integrally with said heating heat exchanger, wherein:

said electrical heating member includes an electrode plate portion integrated with said core portion, and an electrical connection portion through which electrical power of an outer electrical circuit is supplied to said electrode plate portion;

said electrical connection portion is disposed on a downstream side position of said first tank portion in an air flow direction; and said electrical connection portion has a bottom surface higher than a bottom surface of said first tank portion by a predetermined distance.

2. The air conditioner according to claim 1, wherein said heating heat exchanger further includes a second tank portion disposed at an upper side of said core portion to communicate with said tubes.

3. The air conditioner according to claim 2, wherein said heating heat exchanger is disposed in such a manner that the fluid is introduced from said first tank portion, and passes through said tubes to be collected into said second tank portion.

4. The air conditioner according to claim 2, wherein said heating heat exchanger is disposed in said air conditioning case in such a manner that said first tank portion is away from a main flow of air in said air passage.

5. The air conditioner according to claim 1, wherein said electrical connection portion is disposed to electrically connect a terminal portion of said electrode plate portion and a terminal portion of a lead line of the outer electrical circuit.

6. The air conditioner according to claim 1, further comprising a partition member for partitioning said air passage into a first air passage at an upper side and a second air passage at a lower side in said air conditioning case, wherein said electrical heating member is disposed to cross both said first and second air passages.

7. The air conditioner according to claim 1, wherein:

said heating heat exchanger is disposed to be inclined toward a downstream air side relative to a vehicle up-down direction.

8. The air conditioner according to claim 1, further comprising a cooling heat exchanger disposed in said air conditioning case at an upstream air side of said heating heat exchanger, for cooling air passing therethrough.

9. The air conditioner according to claim 1, wherein the fluid flowing through said heating heat exchanger is cooling water for cooling an engine of the vehicle.

10. The air conditioner according to claim 1, wherein said electrical connection portion includes a cover member integrated with said first tank portion at a downstream air side of said first tank portion; and said cover member has a bottom surface separated from the bottom surface of the first tank portion by a predetermined distance to an upper side.

11. The air conditioner according to claim 1, wherein said electrical heating member includes a positive terminal portion and a negative terminal portion which are electrically connected to the outer electrical circuit in said electrical connection portion.

12. An air conditioner comprising:

an air conditioning case for defining an air passage through which air flows;

a heating heat exchanger disposed in said air conditioning case for heating air passing therethrough, said heating heat exchanger including
a core portion having a plurality of tubes through which a fluid flows, and
a tank portion disposed at a lower side of said core portion to communicate with said tubes; and an electrical heating member disposed integrally with said heating heat exchanger, wherein:

said electrical heating member includes an electrode plate portion integrated with said core portion, and an electrical connection portion through which electrical power of an outer electrical circuit is supplied to said electrode plate portion;

said electrical connection portion is disposed to be connected to the tank portion; and the electrical connection portion has a bottom surface higher than a bottom surface of said tank portion by a predetermined distance.

13. The air conditioner according to claim 12, wherein:

said electrical connection portion includes a cover member integrated with said tank portion; and said cover member has a bottom surface separated from the bottom surface of the tank portion upwardly by a predetermined distance.

14. An air conditioner for a vehicle comprising:

an air conditioning case for defining an air passage through which air flows;

a heating heat exchanger disposed in said air conditioning case for heating air passing therethrough, said heating heat exchanger including
a core portion having a plurality of tubes through which a fluid flows and a plurality of fin members connected to said tubes, and
a first tank portion disposed at a lower side of said core portion to communicate with said tubes; and an electrical heating member disposed integrally with said heating heat exchanger, wherein:

said electrical heating member includes an electrode plate portion integrated with said core portion, and an electrical connection portion through which electrical power of an outer electrical circuit is supplied to said electrode plate portion;

said electrical connection portion is disposed on a downstream side position of said first tank portion in an air flow direction; and said electrical connection portion has a bottom surface stepped from a bottom surface of said first tank portion by a predetermined distance.

* * * * *